Patented Oct. 27, 1936

2,058,598

UNITED STATES PATENT OFFICE 2,058,598

COMPOSITION OF MATTER AND METHOD OF MAKING THE SAME

Walter J. Koenig, Philadelphia, Pa., assignor to Sloane-Blabon Corporation, Philadelphia, Pa., a corporation of Delaware No Drawing. Application December 22, 1934, Serial No. 758,861

16 Claims. (Cl. 260—2)

This invention relates to a novel composition of matter and particularly to a composition adapted for coating plastics and the like and especially for enamels such as are used in printing of floor covering materials, etc., in which a constituent of the vehicle is adapted to form a resin by condensation with the oil at moderately elevated temperature. The invention further relates to a new method of drying oil by condensation and to resinous products obtained by such condensation drying.

This application is a continuation in part of my prior co-pending application Serial No. 646,148 filed December 7, 1932, entitled Composition of matter and method of making the same. In said prior application I have disclosed the methods of drying oils by a resin-forming condensation and a number of compositions suitable for drying by such method. With the same objects in view as set forth in my said prior application, I have now discovered that the oxy-terpenes as a class and especially the oxy-cyclic terpenes are especially valuable in compositions which are to be dried by condensation with the oil.

In my said prior application I have disclosed an oxidation product of oxy-terpenes, namely, tri-hydroxy-hexahydro-p-cymene. I have now found that the numerous other oxy-terpenes including oxy derivatives of the terpenes are especially suitable and valuable for the condensation with the drying oils.

I have found, furthermore, that the presence of a small amount of a reactive resin, advantageously incorporated as a varnish or ground into the oil like a pigment, improves greatly the properties of the resulting composition. As compared with the same composition omitting the resin, a smoother film, more glossy and tougher, ordinarily results.

Furthermore, the resin promotes the reaction of the oxy-terpene and the oil, perhaps by catalysis, but the experimental and chemical evidence which I have obtained indicates that this is due to an actual reaction between the resin and the condensing substances.

Inert and acid resins such as rosin, kauri, etc., apparently do not enter into the reaction in this way. In general, however, I have found that synthetic condensation resins which are still capable of further condensation do enter into the condensation between the oil and the oxy-terpenes. Thus, for example, I have used various phenolic condensation resins and paracoumarone resins with especially desirable results.

In referring to the oxy-terpenes, I intend to include those which have a terminal oxygen atom or oxygen-containing group. These are especially the monocyclic hydroxy and keto, etc., terpene derivatives or camphor compounds such as α, β or γ terpineols, carveol, di-hydro carveol, carvone, di-hydro-carvone, menthol, menthone pulegone, 1:8 terpin, 4-iso propyl δ' cyclohexenaldehyde, terpinen-4-ol, carvenone, piperitone, 1:8 cineol, pinol, 4-iso propenyl-δ' cyclohexenaldehyde, and the bicyclic and complex hydroxy and keto, etc., derivatives or camphor compounds, such as comphor, borneol, pinene, glycol, fenchone, fenchyl alcohol, thujone, sabinol, and other related compounds, such as carone.

I am aware that it has been suggested to mix products including or similar to oxy-terpenes with China-wood oil (e. g., German Patent No. 257,601) but no disclosure of proportions, conditions, or of the scientific basis of this invention which could lead to securing the advantages of this invention under any given condition had been made, nor has it ever been suggested or discovered that such products could be reacted with the oil at super-atmospheric temperatures so as to afford a superior method of drying oils, as is disclosed in the present application.

The following is a preferred example of my invention which may be given as exemplary of the compounding and treatment of the compositions embodying my invention:

940 pounds China-wood oil
116 pounds fenchyl alcohol
153 pounds mineral solvent (e. g., a high boiling petroleum thinner known to the trade as "Safety solvent")
235 pounds of a reactive resin varnish made with the following composition:
    470 pounds raw China-wood oil
    160 pounds phenol formaldehyde condensation resin, (e. g., the resin commonly sold as No. 525 Durez)
    380 pounds solvent (e. g., a high boiling petroleum thinner known to the trade as "Safety solvent")

The raw China-wood oil and resin are charged into a varnish kettle and heated to 450° F. during 35 minutes. This temperature is held for 25 minutes at 450° F., after which the varnish is cooled and thinned with solvent.

The 940 pounds of China-wood oil is placed in a Bedford kettle and blown at 180° to 190° F. until it attains a viscosity of about 7 seconds Gardner-Holdt. China-wood oil blown to a viscosity of about 7 seconds Gardner-Holdt is preferred since the oil has the maximum peroxide structures at this point. The air is then shut off and the reactive resin varnish and the fenchyl alcohol and the solvent are added. Heating is continued until the temperature reaches 200° F. and the mixture is then blown for 8 minutes at that temperature. The air is thereupon shut off and the mixture cooled to room temperature.

If more than one condensing agent is used, it is not necessary to add the several condensing agents as a mixture at the start of the reaction. The reaction may be started with a single condensing agent, and after the reaction has progressed to any point before becoming a solid mass, the reaction may be retarded by merely cooling the mixture. Additional condensing agent may then be added, if desired, and the reaction accelerated again by merely raising the temperature. The addition of more than one condensing agent tends to create final products having more complex structures, thereby creating a tougher film in the final product. It is understood that the reaction may be retarded and accelerated any number of times before completion and, if desired, additional condensing agent may be added which enters the condensation reaction. If desired, an additional quantity of the original condensing agent or a mixture of the original and a different type of condensing agent may be added. It is within the scope of this invention to include the addition of an additional quantity of the same condensing agent used at the start of the reaction and/or a different one at any point in the reaction. The feature of accelerating and retarding the reaction at any desired point in the reaction is a very desirable point, and is accomplished by merely controlling the temperature. It is not necessary to add additional condensing agents to again accelerate the reaction after it has been retarded, although this may be done if so desired, as explained above.

The final product obtained, as described above, may be used directly as a varnish. It is, however, especially adapted as a vehicle for enamels, etc., e. g., to be used in the manufacture of floor coverings and like materials. For this purpose the vehicle may be mixed and ground with pigment, etc., substantially as known to the prior art, for example, as set forth in my prior application. However, since the drying of this vehicle is to be effected by a reaction with oxidation minimized so far as practicable, it will be understood that the use of the driers as has been common in the prior art is to be avoided. Small amounts of the driers can be tolerated without serious disadvantage and may even, in some cases, be desirable, e. g., where extreme hardness is to be obtained at some sacrifice in toughness and permanent pliability.

These compositions, either the vehicle as a varnish or the paint, as just described, may be applied even in thick films and dried without wrinkling to form a tough permanently flexible coating which is highly resistant to the action of alkalies and to abrasives.

The condensation reaction by which drying is effected does not take place rapidly at ordinary atmospheric temperatures but requires a moderately elevated temperature, e. g., as high as 115° F., before it will proceed to an economical speed. I have found that temperatures between 130° F. and 145° F. are most advantageous for this purpose. Much higher temperatures may be used, but if too high, the oxy-terpene will be evaporated before a sufficient amount is reacted with the oil.

If the curing is effected in an atmosphere which consists predominantly of the gases given off so that little or no oxygen is present at the interface between the oil and the atmosphere, a smooth glossy film will result. If a dull matte finish is desired, this can be obtained by permitting more oxygen to reach the surface during the condensation period. Thus, for example, if the curing is effected in ordinary linoleum or print goods heaters, the fresh air inlet should be used only if a matte surface is desired. Otherwise, if a smooth glossy finish is intended, the fresh air inlet should be closed and the vapors of the gases given off should be recirculated within the heater.

These paints dry very rapidly at elevated temperatures in substantially inert atmospheres, and excellent results are obtained in dry or highly humid atmospheres. Any degree of gloss may be attained by confining the drying atmosphere more or less. To the extent that this oxidation control is relied upon to produce the gloss or other surface characteristic, the process will be within the scope of my co-pending application Serial No. 7,717, series 1935 filed herewith.

Flat finishes can be obtained by curing in a closed system, when certain thinners, such as kerosene, etc., are used.

In this example, I have set forth in detail the preferred ingredients and proportions. It is understood, however, that these can be varied within relatively wide limits without departing from the scope of my invention. For example, it will be readily understood that the proportions of thinner will depend primarily upon the consistency desired, and these may be varied as will be apparent to anyone skilled in the art. The particular thinner chosen for this purpose also is a matter of free choice, but in general, when glossy finishes are desired, benzine, safety solvent and dipentine are to be preferred. If semi-glossy and flat finishes are desired, kerosene, turpentine or hydroterpine should be used.

Similarly, other resins and varying proportions of resins may be used in place of those specified. For the reactive resins, other phenolic condensation resins or paracoumarone resins may be substituted or other reactive resins which have a tendency to further condensation. Diluent resins, e. g., rosin or any of the natural or inert resins may be used also, but do not replace the reactive resin.

Instead of fenchyl alcohol used in the above example, the various other oxy-cyclic terpenes may be used and may be substituted pound for pound in the formula given. Many of these are, of course, at the present time far too expensive as articles of commerce or as laboratory chemicals to be used commercially for this purpose. So far as I have been able to try them, however, all compounds of this class are capable of condensation with drying oil. Among those which are most practicable from a commercial point of view are the pine oil oxy-terpenes and oxy derivatives of pine oil and, in fact, pine oil or a suitably oxidized pine oil may be used directly, although it is better to use purer oxy-terpene products.

The proportions of the oxy-terpene or oxy-terpenes used in any particular embodiment of my invention are not, of course, limited to those specified in the above examples. It has been demonstrated by careful analysis that a definite amount of the oxy-terpenes enter into reaction with the oil. For example, in the above formula, about 50 per cent of the oxy-terpenes are combined in the oil, and cannot be recovered by volatilization after the curing treatment. The remaining portion, approximately 50 per cent of the oxy-terpenes, is volatilized and serves to minimize oxidation. If a greater amount than specified in the formula is used, it will be merely driven off by volatilization during the drying or curing treatment. Ordinarily it will be necessary to have some excess present in order to take care of the volatilization which necessarily takes place during the initial stages of the curing.

I have also effected condensation and drying of oil films by placing them in an atmosphere of the vapors of the oxy-terpenes. In this case, the vapors are absorbed to some extent into the film where they will react with the oil. Ordinarily it will be more convenient to incorporate the oxy-terpene with the oil as described above, but this tendency to absorb the oxy-terpene vapors from the atmosphere should be kept in mind, especially where several different compositions are to be cured in the same heater.

Other oils in which I include treated and untreated drying oils, treated semi-drying oils and non-drying oils, that possess double bonds in conjugate arrangement, e. g. —C=C—C=C— or —C=C—C=C—C=C—, (such as China-wood oil, fish oils, oiticica oil, blown or properly oxidized linseed oil, blown or properly oxidized soya bean oil, blown or properly oxidized poppyseed oil, etc., castor oil heated under reduced pressures to form conjugate double bond structure and esterified, blown or properly oxidized drying oil fatty acids, and the above treated and untreated oils, having the above double bond conjugate structure, blown with drying oil fatty acids or such oils to which blown or properly oxidized fatty acids have been added), fall within the scope of my invention.

I prefer to use blown or properly oxidized oils, although the raw oils having the above described conjugate double bond arrangement will dry in accordance with my invention.

The conversion of non-drying oils into drying oils for the purposes of this invention,—that is, for drying by a resin-forming condensation as herein disclosed, may be effected by the addition of unsaturated fatty acids similar to those of the drying oils, as more fully described in the copending application of Koenig, Pohl and Walker, Serial No. 646,150, now Patent 2,047,150. Even the non-drying oils, however, usually include at least one unsaturated double bond in their chemical structures and, as already indicated above, I regard this double bond as important in the condensation reaction and, other things being equal, prefer to use the oils having a higher degree of unsaturation.

When the non-drying oils converted by the addition of drying oil fatty acids and resin-forming substances, as described above, or the fatty acids substantially alone, are used in the present invention, the curing temperatures should be higher, and ordinarily the times also should be longer.

In the case of certain oils which do not have conjugate double bond structures and particularly linseed oil, it has been shown for example by Scheiber, that a conjugate structure is produced by blowing. This, undoubtedly, accounts for much of the improvement in these oils when blown, but even China-wood oil is improved for this reaction by blowing.

Powdered aluminum or other materials may be used as a catalyst, as for example, alkalies, e. g., sodium borate or acid, e. g., acetic or nitric acid, or other finely divided metals, e. g. nickel. When these are included they reduce the time of curing and/or preliminary treatment.

A paint is given above as one example of the invention because the invention is of great practical importance in the field of print paints for floor coverings, etc. Clear varnishes, however, may be used which may be similar to the paint, but without the pigment; and other types of composition, both fluid and plastic, may be similarly made. These compositions, whether liquid or solidified, may also be dispersed in water emulsions. Printing inks, lithograph varnishes, coatings for tin cans, etc., coating, impregnating and insulating varnishes and paints in general, protective coatings for automobiles, machinery, furniture and other articles, and plastics both for manufacture of linoleum, tiles and similar products, and for molded articles such as household utensils, decorative objects, implements, handles and numerous other articles now made of molded plastics, all may be made with compositions of my invention.

Where a gelled vehicle is desired the thinner may be partially or entirely omitted and the heat treatment continued until the desired viscosity is obtained, as will be readily understood by those skilled in the art. In this case also it may be desirable to blow the oil to a somewhat heavier consistency before the oxy-terpene ingredient is added.

It will already have been appreciated by those skilled in the art that a feature of primary importance of the present invention is that the reactions herein disclosed are capable of drying the oils in films without objectionable distortion, whether the oil is extended upon a surface of large area or as an adhesive film on particles of a plastic composition. It constitutes, therefore, not only a method of obtaining novel resinous compositions, but even more important—a method of drying oils by converting them into such resinous products directly and after they have been given their form as finally desired.

It is of primary importance, moreover, that according to the present invention the reaction can be initiated en masse and then interrupted at a point short of complete drying. Thus the more costly final step of heating the finished article can be reduced to a very short treatment.

It seems clear that a condensation occurs. The extent of condensation depends on the condensing agents used, but regardless whether the condensation is partial or practically complete, the reaction falls within the scope of this invention, since my invention embraces rapid drying action at super-atmospheric temperatures in substantially non-oxidizing atmospheres as due to the condensation. In the case of partial condensation, i. e., where the amount of condensing agent is less than in stoichometric relations, it is my theory that the presence of the particular type of condensation product of the oil and condensing agent is responsible for the rapid drying. The invention described herein cannot be construed in the same light as the action of driers, as the action proceeds unimpeded or rapidly, as the case may be, in substantially non-oxidizing atmospheres at super-atmospheric temperatures with definite favorable results starting as low as 120° F., which, in addition, differentiates from polymerization and oxidation under similar conditions.

In the above specification, I have given examples and suggested certain modifications for the purpose of illustrating the invention, and without in any way attempting to exhaustively cover all the various modifications and applications of my invention. Similarly, I have expressed certain theories which I have developed in the course of my investigations and practical experience with this invention, which, I believe, may be helpful to those who, subsequently, apply and extend the application of my invention. However, I have not as yet tested these theories sufficiently to set them up as certainly correct, and since the invention is in no way dependent upon the correctness of any theory which I have expresed, it is to be understood that the scope of my invention and claims is in no way to be limited thereby.

I have used the term "condensation" herein broadly to mean the union of two or more organic substances with or without the elimination of component elements.

I claim:

1. The method of hardening drying oil which comprises condensing a mixture in which the condensation reactants consist of oxidized drying oil having double bonds in conjugate arrangement and an oxy-cyclic terpene at super-atmospheric temperature.

2. The method as described in claim 1, in which the condensation reaction occurs in the presence of a synthetic resin.

3. The method as described in claim 1, in which the hardening of the oil occurs in an atmosphere consisting primarily of the gases given off by the mixture.

4. The method as described in claim 1, in which the final hardening of the oil takes place in a substantially non-oxidizing atmosphere.

5. The method as described in claim 1, in which the condensation reaction is retarded by cooling, adding an additional quantity of an oxy-cyclic terpene, again raising and maintaining the temperature until the condensation is complete.

6. The method as described in claim 1, in which the condensation reaction is retarded by cooling, shaping the mixture into its final useful form, accelerating the reaction by increasing the temperature to super-atmospheric conditions, and maintaining the temperature until hardening is complete.

7. The method as described in claim 1, in which the oxidized drying oil is China-wood oil.

8. The method of hardening drying oil which comprises condensing a mixture in which the condensation reactants consist of oxidized drying oil having double bonds in conjugate arrangement and an oxy-mono cyclic terpene at super-atmospheric temperature.

9. The method as described in claim 8, in which the oxy-mono-cyclic terpene is terpineol.

10. The method of hardening drying oil which comprises condensing a mixture in which the condensation reactants consist of oxidized drying oil having double bonds in conjugate arrangement and an oxy-bicyclic terpene at super-atmospheric temperature.

11. The method as described in claim 10, in which the oxy-bicyclic terpene is fenchone.

12. The method as described in claim 10, in which the oxy-bicyclic terpene is fenchyl alcohol.

13. The method of hardening drying oil which comprises condensing a mixture in which the condensation reactants consist of oxidized drying oil having double bonds in conjugate arrangement and oxy-cyclic terpenes at super-atmospheric temperature.

14. The method as described in claim 13, in which the oxidized drying oil is China-wood oil.

15. A composition of matter adapted for use in coating materials, plastics, and the like, which comprises a condensation mixture in which the condensation reactants consist of oxidized drying oil having double bonds in conjugate arrangement and an oxy-cyclic terpene.

16. A composition of matter adapted for use in coating materials, plastics and the like, which comprises a condensation mixture in which the condensation reactants consist of oxidized drying oil having double bonds in conjugate arrangement and oxy-cyclic terpenes.

WALTER J. KOENIG.